(12) United States Patent
Castillo Jaime et al.

(10) Patent No.: US 10,518,737 B2
(45) Date of Patent: Dec. 31, 2019

(54) AIRBAG ASSEMBLY

(71) Applicant: Ford Global Technologies, LLC, Dearborn, MI (US)

(72) Inventors: Luis Enrique Castillo Jaime, Distrito Federal (MX); Moises Blancas Galicia, Mexico City (MX); Srinivas Reddy Malapati, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 231 days.

(21) Appl. No.: 15/679,851

(22) Filed: Aug. 17, 2017

(65) Prior Publication Data
US 2019/0054887 A1 Feb. 21, 2019

(51) Int. Cl.
*B60R 21/231* (2011.01)
*B60R 21/2338* (2011.01)
*B60R 21/205* (2011.01)
*B60R 21/00* (2006.01)

(52) U.S. Cl.
CPC ........ *B60R 21/231* (2013.01); *B60R 21/2338* (2013.01); *B60R 21/205* (2013.01); *B60R 2021/0004* (2013.01); *B60R 2021/0009* (2013.01); *B60R 2021/0048* (2013.01); *B60R 2021/23382* (2013.01)

(58) Field of Classification Search
CPC . B60R 21/231; B60R 21/233; B60R 21/2338; B60R 21/205; B60R 2021/23382; B60R 2021/23509; B60R 2021/0032; B60R 2021/23308; B60R 2021/0004; B60R 2021/0009; B60R 2021/0048; B60R 2021/23324

USPC ........................................... 280/743.2, 730.1
See application file for complete search history.

(56) References Cited

U.S. PATENT DOCUMENTS

| | | | |
|---|---|---|---|
| 8,226,118 B2* | 7/2012 | Rose | B60R 21/2338 |
| | | | 280/743.2 |
| 9,150,186 B1* | 10/2015 | Belwafa | B60R 21/233 |
| 9,162,645 B2 | 10/2015 | Cho et al. | |
| 9,248,799 B2 | 2/2016 | Schneider et al. | |
| 9,308,883 B1* | 4/2016 | Schneider | B60R 21/231 |
| 9,421,942 B2* | 8/2016 | Shin | B60R 21/239 |
| 9,428,140 B2 | 8/2016 | Lee | |
| 9,533,652 B1 | 1/2017 | Paxton et al. | |
| 9,573,555 B2* | 2/2017 | Jang | B60R 21/233 |
| 9,707,921 B2* | 7/2017 | Fischer | B60R 21/231 |
| 9,896,056 B2* | 2/2018 | Burczyk | B60R 21/231 |
| 2012/0193896 A1* | 8/2012 | Turnbull | B60R 21/233 |
| | | | 280/729 |

(Continued)

FOREIGN PATENT DOCUMENTS

GB 2472119 A 1/2011

*Primary Examiner* — Paul N Dickson
*Assistant Examiner* — Hilary L Johns
(74) *Attorney, Agent, or Firm* — Frank A. MacKenzie; Bejin Bieneman PLC (57) ABSTRACT

An airbag includes a main panel defining an inflation chamber and being inflatable to an inflated position. The airbag includes an extension extending from the main panel and defining an extension chamber. The airbag includes a side panel spaced from the main panel in the inflated position and fixed to the extension. The side panel is external to the extension chamber. The side panel, the extension, and the main panel define a cavity external to the extension chamber.

20 Claims, 7 Drawing Sheets

(56) References Cited

U.S. PATENT DOCUMENTS

| | | | | |
|---|---|---|---|---|
| 2013/0001934 | A1* | 1/2013 | Nagasawa | B60R 21/233 280/731 |
| 2015/0217716 | A1* | 8/2015 | Anderson | B60R 21/2338 280/729 |
| 2016/0250993 | A1* | 9/2016 | Nagatani | B60R 21/203 280/730.1 |

* cited by examiner

FIG. 10

AIRBAG ASSEMBLY

BACKGROUND

Vehicles are equipped with airbags. In the event of an impact, an inflator activates and provides inflation medium to the airbags, and the airbags pressurize and act as cushions for occupants during the impact. The airbags are located at various fixed positions in vehicles. Vehicles typically include a driver airbag mounted in the steering wheel, a passenger airbag mounted in the instrument panel in a vehicle-forward direction from the front passenger seat, and side air curtains mounted in the roof rails.

DETAILED DESCRIPTION

An airbag includes a main panel defining an inflation chamber and being inflatable to an inflated position. The airbag includes an extension extending from the main panel and defining an extension chamber. The airbag includes a side panel spaced from the main panel in the inflated position and fixed to the extension. The side panel is external to the extension chamber. The side panel, the extension, and the main panel define a cavity external to the extension chamber.

The extension may have a cross section that is generally concave.

The extension may include a perimeter surface extending from the main panel and an outer surface attached to the perimeter surface and spaced from the main panel in the inflated position, and the extension chamber may be defined by the perimeter surface, the outer surface, and the main panel.

The side panel may be fixed to the perimeter surface.

The cavity may be defined by the perimeter surface, the side panel, and the main panel.

The extension chamber may be in fluid communication with the inflation chamber.

The extension chamber may be in fluid communication with the inflation chamber via a hole defined by the main panel.

The airbag may include a tether in the extension chamber extending across the main panel from one portion of the extension to another portion of the extension.

The extension may include a perimeter surface extending from the main panel and an outer surface attached to the perimeter surface and spaced from the main panel in the inflated position, and the tether may extend from one portion of the perimeter surface to another portion of the perimeter surface.

A volume of the extension chamber may be less than a volume of the inflation chamber.

The cavity may be external to the inflation chamber.

At least a portion of the extension may be between the side panel and the main panel.

The side panel may be uninflatable when the main panel is in the inflated position.

The main panel may include an impact surface facing a rearward direction, and the cavity may be open in the rearward direction.

The cavity may be designed to receive a head of an occupant.

The main panel may include an impact surface and the extension may be spaced from the impact surface.

The extension may include a first leg and a second leg extending relative to the first leg at an angle less than 180 degrees, and the side panel extends across the main panel in the inflated position from the first leg to the second leg.

The extension may be cantilevered on the main panel.

An instrument panel assembly includes an instrument panel and an airbag supported on the instrument panel. The airbag includes a main panel defining an inflation chamber and being inflatable to an inflated position. The airbag includes an extension extending from the main panel and defining an extension chamber. The airbag includes a side panel spaced from the main panel in the inflated position and fixed to the extension. The side panel is external to the extension chamber. The side panel, the extension, and the main panel define a cavity external to the extension chamber.

The extension in the inflated position may be spaced from the instrument panel.

With reference to the Figures, wherein like numerals indicate like parts throughout the several views, an airbag 76 is generally shown. The airbag 76 includes a main panel 22 defining an inflation chamber 32 and being inflatable to an inflated position. The airbag 76, in the inflated position, includes an extension 24 extending from the main panel 22 and defining an extension chamber 38. The airbag 76 includes a side panel 26 spaced from the main panel 22 in the inflated position and fixed to the extension 24. The side panel 26 is external to the extension chamber 38, i.e., is not inflatable. The side panel 26, the extension 24, and the main panel 22 define a cavity 28 external to the extension chamber 38.

The main panel of the airbag may provide the benefits of airbag protection during a generally frontal impact. During other impacts, such as offset impacts, angular impacts, small overlap impacts, etc., a head of an occupant may slide off of the main panel and potentially contact a component of a vehicle, such as an instrument panel, dashboard, etc. The cavity, as defined by the side panel, the extension, and the main panel, may receive the head during impacts such as offset, angular, small overlap, etc., and may reduce the risk of the head contacting vehicle components such as the instrument panel, dashboard, etc.

Figure 1:
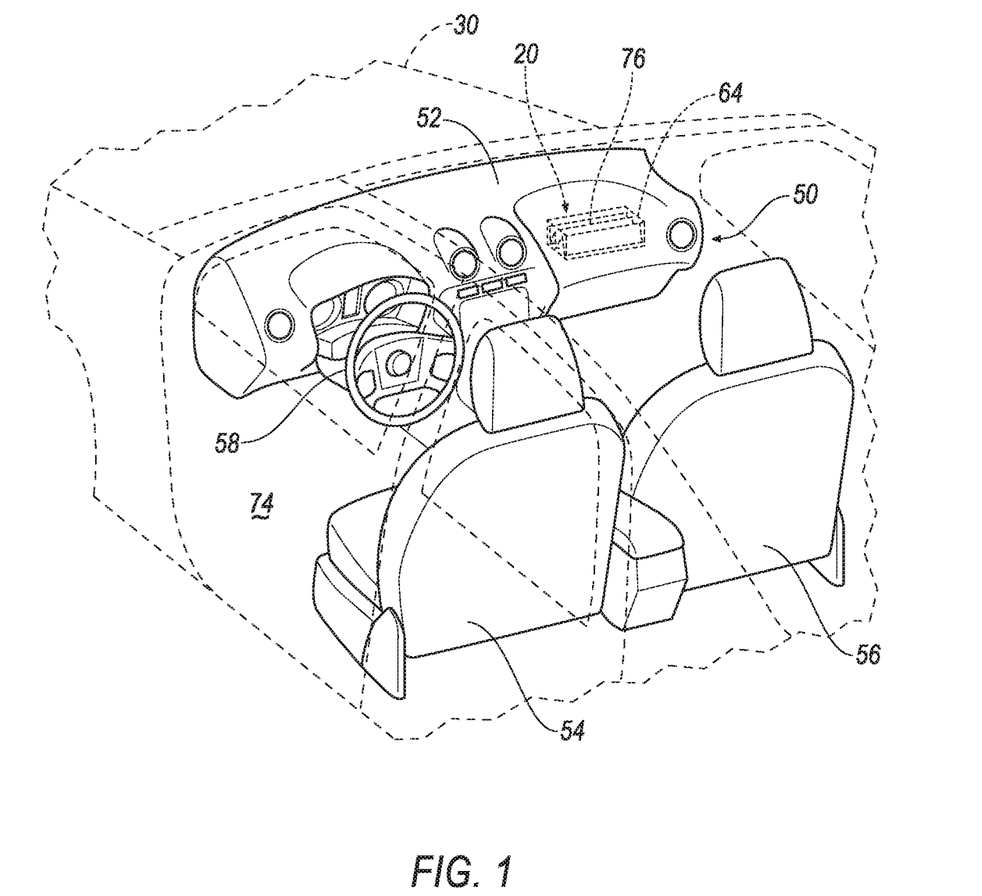
FIG. 1 is a perspective view of a vehicle with an airbag in an uninflated position.

With reference to FIG. 1, a vehicle 30 includes a passenger cabin 74 to house occupants 60, if any, of the vehicle 30. The passenger cabin 74 includes one or more front seats disposed at a front of the passenger cabin 74. For example, the front seats may be a driver seat 54 and a passenger seat 56. The passenger cabin 74 may include one or more back seats (not shown) disposed behind the driver seat 54 and passenger seat 56. The passenger cabin 74 may also include third-row seats (not shown) at a rear of the passenger cabin 74. In FIG. 1, the driver seat 54 and passenger seat 56 are shown to be bucket seats, but the driver seat 54 and passenger seat 56 may be other types. The position and orientation of the seats and components thereof may be adjustable by the occupant 60.

The vehicle 30 may include an instrument panel assembly 50 including an instrument panel 52. The instrument panel 52 may be disposed at a forward end of the passenger cabin 74 and face toward the driver seat 54 and passenger seat 56. The instrument panel 52 may include vehicle controls, including a steering wheel 58. The steering wheel 58 may be positioned in front of the driver seat 54.

Figure 2:
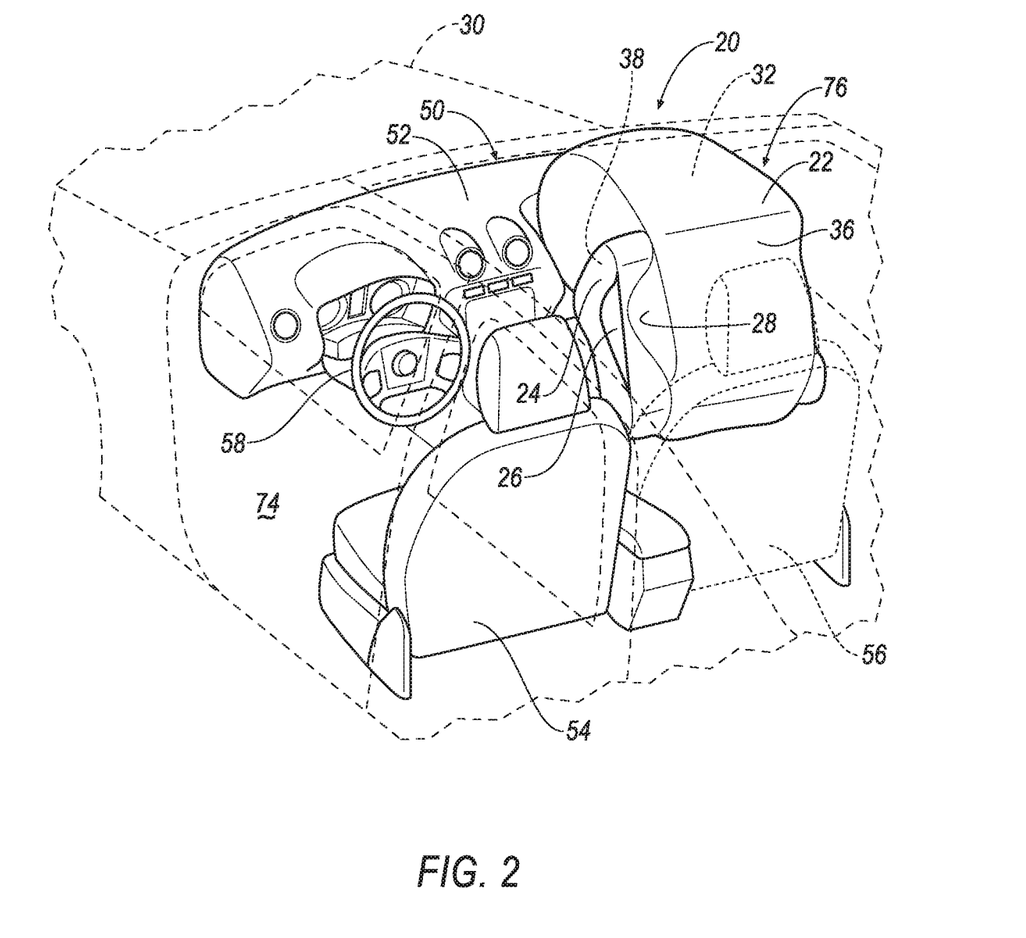
FIG. 2 is a perspective view of the vehicle with the airbag in an inflated position.

With reference to FIGS. 1 and 2, the instrument panel assembly 50 may include an airbag assembly 20. The airbag assembly 20 includes an airbag 76 and a housing 64. The airbag 76 includes the main panel 22, the extension 24, and the side panel 26. The airbag 76, i.e., the main panel 22 and the extension 24, is inflatable from an uninflated position (FIG. 1) to an inflated position (FIG. 2).

As set forth above, the airbag assembly 20 may include the housing 64. The airbag 76 in the uninflated position may be disposed in the housing 64, e.g., the airbag 76 may be folded or rolled into the housing 64. The housing 64 may be disposed in the instrument panel 52. The housing 64 may be positioned in front of the passenger seat 56, e.g., the airbag assembly 20 may be positioned on a passenger side of the vehicle 30. As another example, the airbag assembly 20 may be positioned on a driver side of the vehicle 30, e.g., the housing 64 may be disposed in the steering wheel 58. Alternatively, the airbag assembly 20 may be positioned in any suitable location in the vehicle 30. The housing 64 may be formed of any material, e.g., a rigid polymer, a metal, a composite, etc.

The airbag 76, i.e., the main panel 22 and the extension 24, may be formed of any suitable airbag material, for example, a woven polymer. For example, the airbag 76 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane. The main panel 22 and the extension 24 may be formed of the same material, two different materials, or any suitable combination.

With reference to FIGS. 2-9, the airbag 76 includes the main panel 22. In the inflated position, the main panel 22 may be, for example, a bulbous shape, a spherical shape, a rectangular shape, or any other suitable shape. The main panel 22 defines the inflation chamber 32. Specifically, the main panel 22 extends around the inflation chamber 32. The main panel 22 has multiple sides that extend from the housing 64 in a generally vehicle-rearward direction and an impact surface 36 that extends in a generally vertical direction in front of the passenger seat 56, and the sides of the main panel 22 extend around the inflation chamber 32. The main panel 22 may be a single sheet of material or may be multiple sheets of material connected together, e.g., by stitching.

With reference to FIG. 2, the main panel 22 may include the impact surface 36 facing a rearward direction, e.g., a generally vehicle-rearward direction. The impact surface 36 may be disposed between the passenger seat 56 and the instrument panel 52 when the airbag 76 is in the inflated position. The impact surface 36 is designed to be impacted by the occupant during a frontal vehicle impact. The rest of the main panel 22 extends from the impact surface 36 toward the instrument panel 52, i.e., the main panel 22 changes direction from the impact surface 36 toward the instrument panel 52. The impact surface 36 may be generally flat, i.e., is flat or includes a slight curve resulting from the inflation of the airbag and the pliable material type of the main panel 22.

Figure 3:
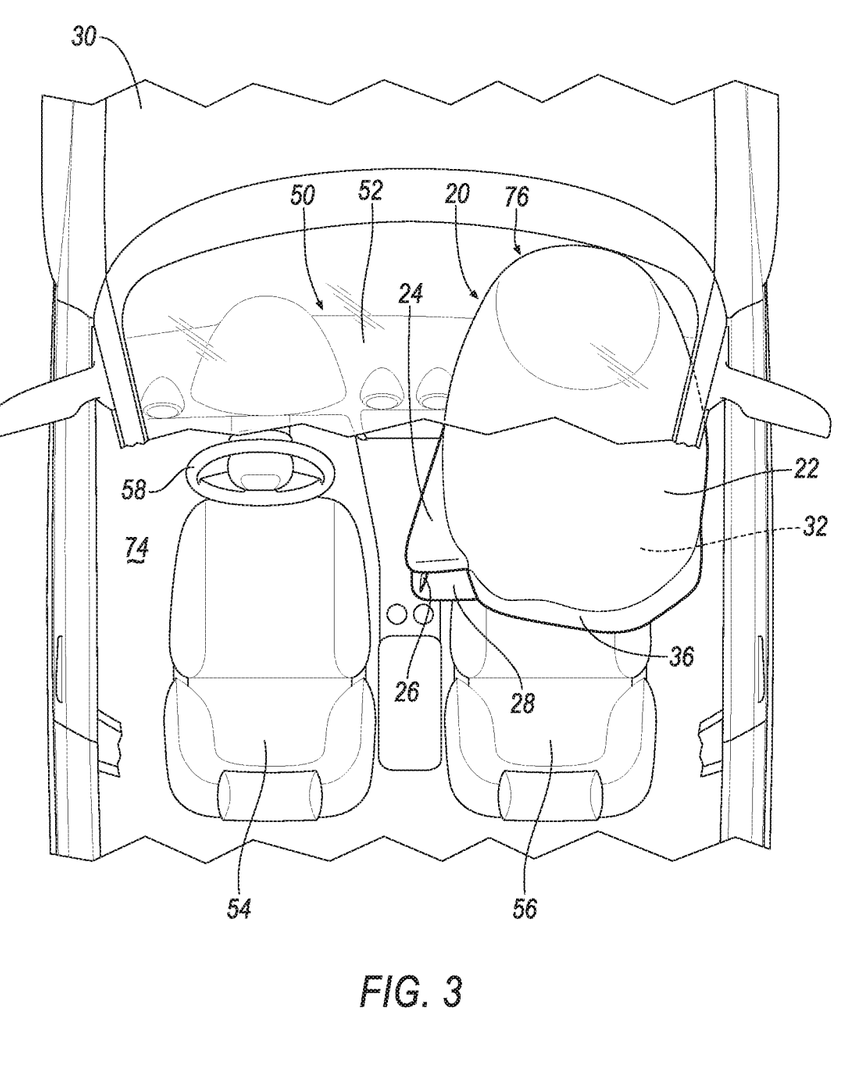
FIG. 3 is a top view of the vehicle with the airbag in the inflated position.

With reference to FIGS. 2 and 3, the extension 24 may be spaced from the impact surface 36. For example, the extension 24 may be positioned on a side of the main panel 22 generally facing a driver side of the vehicle 30. As another example, the extension 24 may be positioned on a side of the main panel 22 generally facing a passenger side door of the vehicle 30. As yet another example, the airbag 76 may include two extensions 24 each on either side of the impact surface 36. Alternatively, there may be any suitable number of extensions 24 configured in any suitable manner on the main panel 22.

With reference to FIG. 3, the extension 24 in the inflated position may be spaced from the instrument panel 52. For example, the extension 24 in the inflated position may not contact the instrument panel 52. Alternatively, the extension 24 in the inflated position may contact the instrument panel 52. In this orientation, a force, from, e.g., a head 62 of the occupant 60, applied on the extension 24 in a generally vehicle-forward direction may be opposed by the instrument panel 52 exerting a force on the extension 24 in a generally vehicle-rearward direction.

Figure 4:
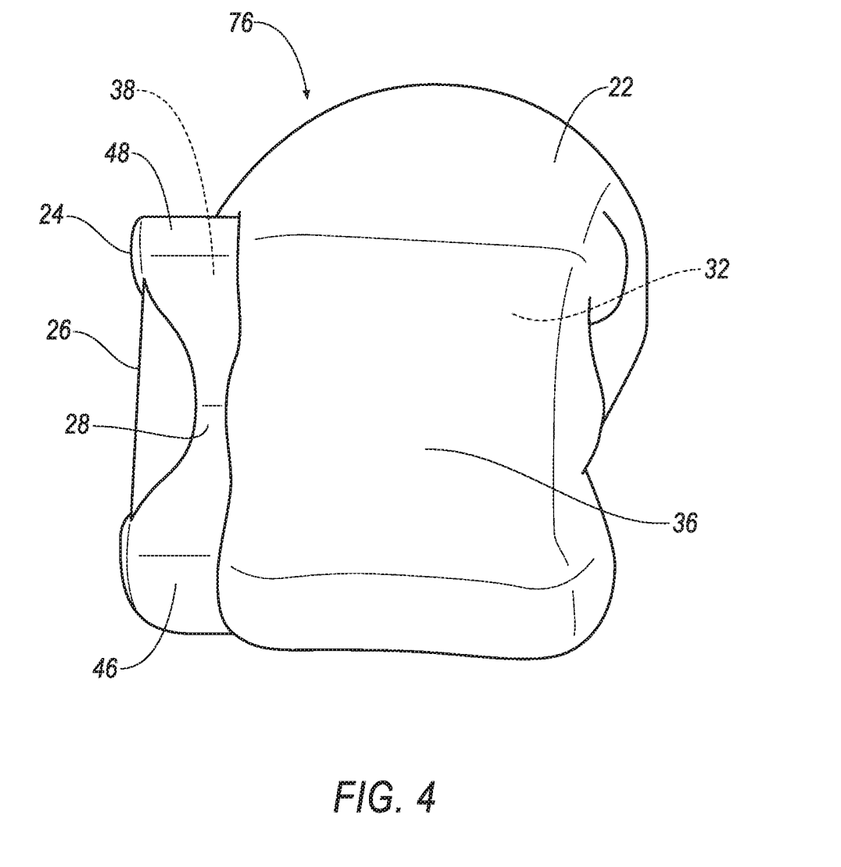
FIG. 4 is a front view of the airbag in the inflated position.
Figure 5:
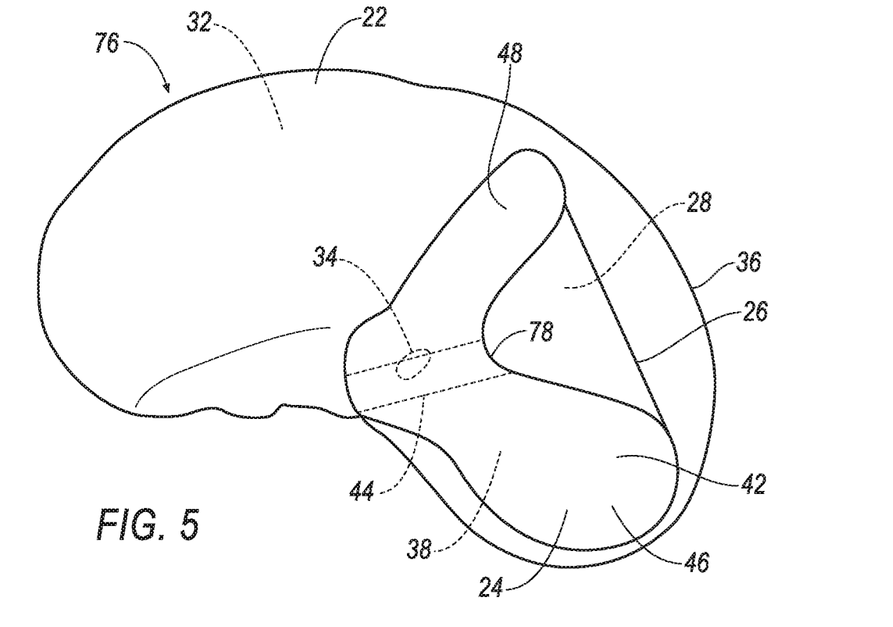
FIG. 5 is a side view of the airbag in the inflated position.
Figure 6:
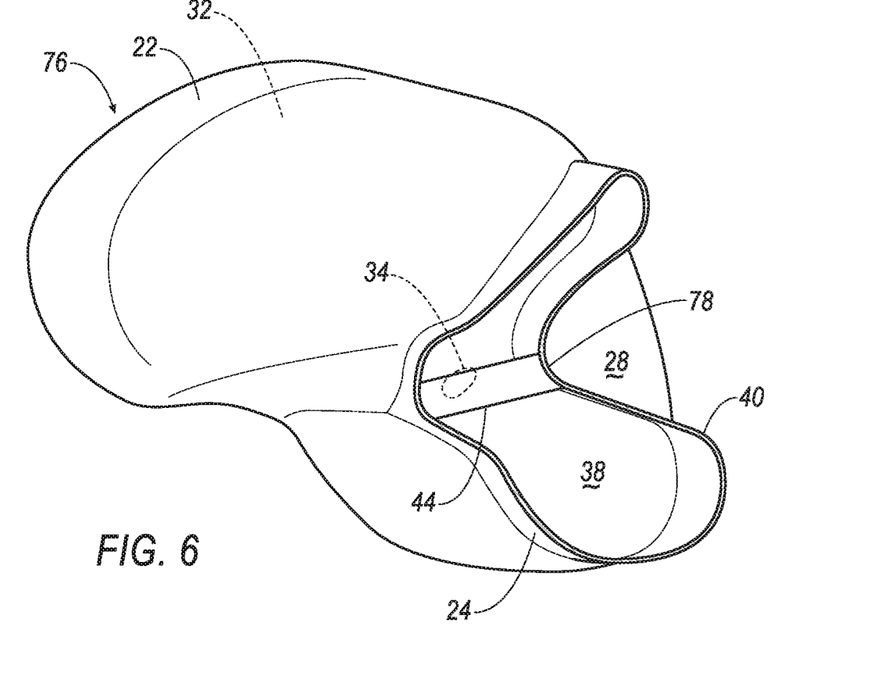
FIG. 6 is a cross-sectional view of the airbag in the inflated position.

With reference to FIGS. 4-6, the extension 24 may have a cross section that is generally concave. For example, the cross section of the extension 24 may be generally C-shaped, generally U-shaped, generally V-shaped, generally r-shaped, etc. The cross section of the extension 24 may have a generally radial shape, a generally arced shape, a shape with corners, or any suitable combination of the previously described shapes.

With continued reference to FIGS. 4-6, the extension 24 may include a first leg 46 and a second leg 48 extending relative to the first leg 46 at an angle less than 180 degrees. The second leg 48 may extend relative to the first leg 46 by directly contacting the first leg 46, or there may be intermediate members between the first leg 46 and the second leg 48. As one example, the first and second legs 46, 48 may not extend past the impact surface 36, as shown in FIG. 5. As another example, the first and second legs 46, 48 may extend past the impact surface 36. The first and second legs 46, 48 may have any suitable length, width, and height.

With continued reference to FIGS. 4-6, the extension 24 may include a perimeter surface 40 (identified in FIG. 5) extending from the main panel 22 and an outer surface 42 attached to the perimeter surface 40 and spaced from the main panel 22 in the inflated position. The perimeter surface 40 may extend generally perpendicularly from the main panel 22, or in any other suitable manner. The perimeter surface 40 and the outer surface 42 may be two separate components. Alternatively, the perimeter surface 40 and the outer surface 42 may be one, singular component.

With continued reference to FIGS. 4-6, the extension 24 may be cantilevered on the main panel 22. For example, the extension 24 may include a base (not numbered) fixed, e.g., stitched, glued, integrally formed, etc., to the main panel 22, and a distal end (not numbered), e.g., the outer surface 42, spaced from the base. When a force, from, e.g., the head 62 of the occupant 60, is applied on the extension 24 in a generally vehicle-forward direction, the cantilevered relationship between the extension 24 and the main panel 22 causes the distal end to move generally along the direction of the force, and the base remains fixed to the main panel 22. This may result in the extension 24 pulling the main panel 22 generally along the direction of the force, and the main panel 22 may rotate generally along the direction of the force.

The extension chamber 38 may be defined by the perimeter surface 40, the outer surface 42, and the main panel 22. The extension chamber 38 may be inflatable at substantially the same time as the inflation chamber 32. Alternatively, the extension chamber 38 may inflate at a different time than the inflation chamber 32. For example, the extension chamber 38 may be in fluid communication with the inflation chamber 32. Alternatively, the extension chamber 38 may be separate and distinct from the inflation chamber 32 with no fluid communication between the extension chamber 38 and the inflation chamber 32. As one example, a volume of the extension chamber 38 may be less than a volume of the inflation chamber 32. As another example, the volume of the extension chamber 38 may be greater than or equal to the volume of the inflation chamber 32.

With reference to FIGS. 5 and 6, the extension chamber 38 may be in fluid communication with the inflation chamber 32 via a hole 34 defined by the main panel 22. The hole 34 may be positioned within the confines of the perimeter surface 40, e.g., below the outer surface 42. During inflation of the inflation chamber 32, the hole 34 may allow the extension chamber 38 to inflate at substantially the same time as the inflation chamber 32. The hole 34 may be, for example, a vent, e.g., an open vent, a one-way vent, a two-way vent, an active vent, etc., to control gas flow into the extension chamber 38. As another example, the hole 34 may be substantially the same size and shape as the perimeter surface 40, such that there is complete fluid communication between the inflation chamber 32 and the extension chamber 38, and the inflation chamber 32 extends into the entirety of the extension chamber 38.

With continued reference to FIGS. 5 and 6, the airbag 76 may include a tether 44 in the extension chamber 38 extending across the main panel 22 from one portion of the extension 24 to another portion of the extension 24. For example, the tether 44 may extend from one portion of the perimeter surface 40 to another portion of the perimeter surface 40. Specifically, the extension 24 may include a trough 78 defined by the perimeter surface 40, and the tether 44 may be attached to the trough 78. The tether 44 may extend from the trough 78 to, e.g., another portion of the perimeter surface 40, the main panel 22, the outer surface 42, or any other suitable location. The tether 44 may maintain the shape of the extension 24 throughout inflation of the airbag 76. For example, as the airbag 76 inflates, an inflatable medium, such as a gas, may exert a force on the perimeter surface 40, and the tether 44 may resist and/or oppose the force exerted on the perimeter surface 40, such that the shape of the extension 24 is maintained. The tether 44 may be attached to the extension 24 in any suitable manner, e.g., stitching, fusing, adhesive, integral formation, etc. The tether 44 may be formed of the same type of material as the airbag 76, or from any other suitable type of material.

With reference to FIGS. 4 and 5, the side panel 26 may be fixed to the extension 24. For example, the side panel 26 may be fixed to the perimeter surface 40, the outer surface 42, or any other suitable location on the extension 24. As another example, the side panel 26 may extend across the main panel 22 in the inflated position from the first leg 46 to the second leg 48. The side panel 26 may be fixed to the extension 24 in any suitable manner, e.g., stitching, fusing, adhesive, integral formation, etc. The side panel 26 may be formed of the same material as the airbag 76, or any other suitable material, such as, e.g., a material with elastic properties. The side panel 26 may have any suitable shape, such as a generally rectangular shape, a circular shape, an elliptical shape, a triangular shape, etc.

At least a portion of the extension 24 may be between the side panel 26 and the main panel 22 when the airbag 76 is in the inflated position. For example, from the perspective shown in FIG. 4, a portion of the extension 24 is shown as being between the side panel 26 and the main panel 22. The side panel 26 may be positioned at any location on the extension 24, e.g., the perimeter surface 40, outer surface 42, etc. For example, the side panel 26 may be fixed to the extension 24 closer to the main panel 22 such that a smaller portion of the extension 24 is between the side panel 26 and the main panel 22. As another example, the side panel 26 may be fixed to the extension 24 farther from the main panel 22, such that a larger portion of the extension 24 is between the side panel 26 and the main panel 22.

As one example, the side panel 26 may be uninflatable when the main panel 22 is in the inflated position. That is, the side panel 26 may be sealed off from the extension chamber 38, i.e., the side panel 26 may be a solid, non-hollow member as shown in FIGS. 4 and 5. As another example, the side panel 26 may be in fluid communication with the extension chamber 38, i.e., the side panel 26 may have an inflatable chamber (not shown).

As shown in FIG. 4, the side panel 26 may have a material thickness that is uniform across the entire side panel 26, however, it should be understood that the material thickness may be uniform or variable. For example, the material thickness may be greater at a location between the first leg 46 and the second leg 48, i.e., at a location where the head 62 of the occupant 60 may contact the side panel 26. Alternatively, the material thickness may vary in any suitable manner.

With reference to FIGS. 4-6, the side panel 26, the extension 24, and the main panel 22 may define the cavity 28. As one example, the cavity 28 may be defined by the perimeter surface 40, the side panel 26, and the main panel 22. As another example, the cavity 28 may be defined by the outer surface 42, the side panel 26, and the main panel 22. The cavity 28 may be open in the rearward direction. For example, the impact surface 36 and the opening of the cavity 28 may face in the same direction, i.e., the generally vehicle-rearward direction. The cavity 28 may be designed to receive the head 62 of the occupant 60, i.e., the size and shape of the cavity 28 may be such that the cavity 28 is capable of receiving the head 62 of the occupant 60 via the opening of the cavity 28.

As set forth above, the cavity 28 is external to the extension chamber 38. That is, there is no fluid communication between the cavity 28 and the extension chamber 38. The cavity 38 may be external to the inflation chamber 32. That is, there may be no fluid communication between the cavity 38 and the inflation chamber 32.

Figure 7:
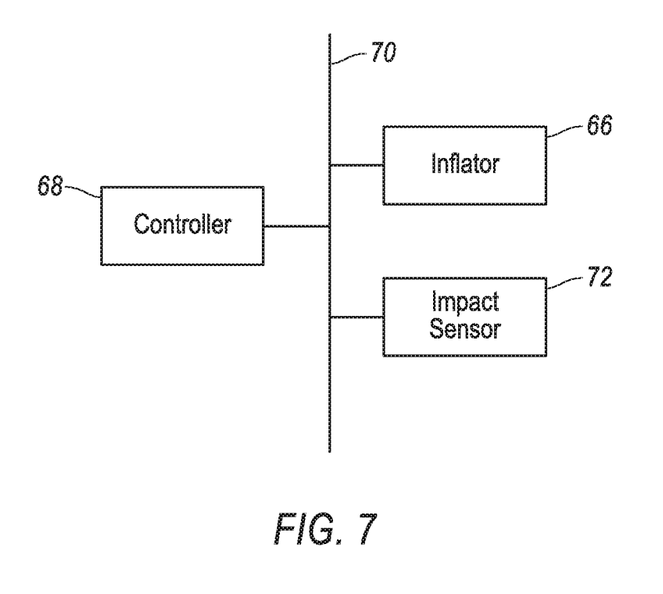
FIG. 7 is a block diagram of a control system for controlling the inflation of the airbag.

With reference to FIG. 7, an inflator 66 may be connected to the airbag 76 and in communication with the inflation chamber 32 of the main panel 22 and the extension chamber 38 of the extension 24. Upon receiving a signal from, e.g., a controller 68, the inflator 66 may inflate the airbag 76 with an inflatable medium, such as a gas. Specifically, the inflator 66 inflates the inflation chamber 32 of the main panel 22 and the extension chamber 38 of the extension 24. The inflator 66 may be, for example, a pyrotechnic inflator that uses a chemical reaction to drive inflation medium to the airbag 76.

The inflator 66 may be of any suitable type, for example, a cold-gas inflator. As one example, the inflator 66 may inflate the extension chamber 38 in addition to the inflation chamber 32. As another example, there may be another inflator 66 connected to the extension chamber 38.

The controller 68 is a microprocessor-based controller. The controller 68 includes a processor, memory, etc. The memory of the controller 68 includes memory for storing instructions executable by the processor as well as for electronically storing data and/or databases. The controller 68 may be the same or a different device than the computer responsible for autonomously controlling the vehicle 30.

The controller 68 may transmit signals through a communications network 70 such as a controller area network (CAN) bus, Ethernet, WiFi, Local Interconnect Network (LIN), onboard diagnostics connector (OBD-II), and/or by any other wired or wireless communications network. The controller 68 may be in communication with the inflator 66 and an impact sensor 72 via the communications network 70.

Figure 9:
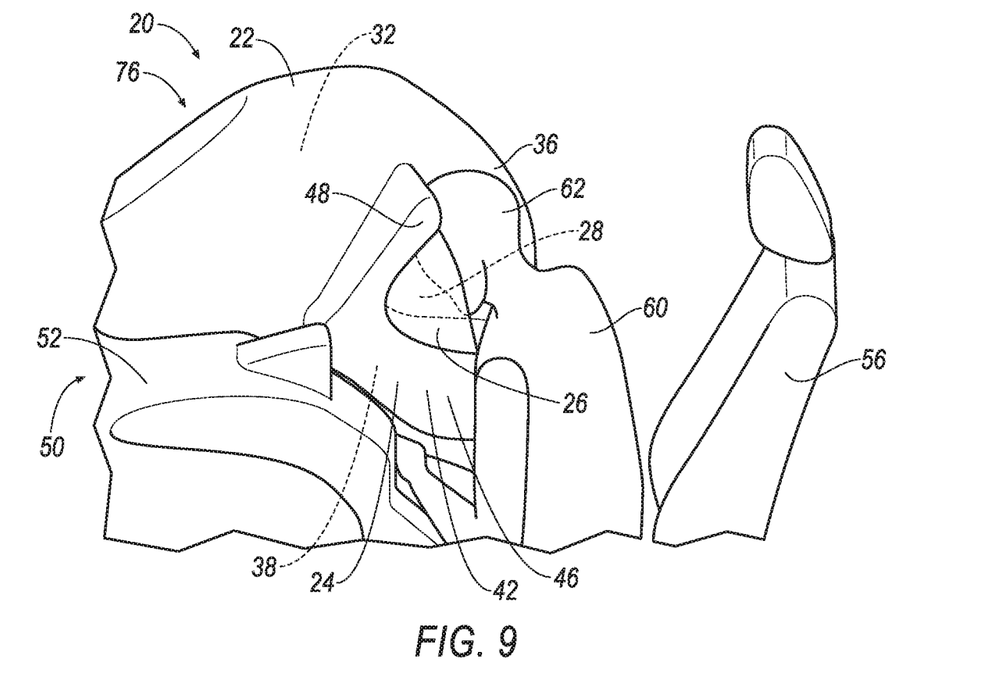
FIG. 9 is a side view of the airbag in the inflated position and the occupant during a second stage of a vehicle impact.

With continued reference to FIG. 9, the impact sensor 72 is adapted to detect an impact to the vehicle 30. The impact sensor 72 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 72 may be located at numerous points in or on the vehicle 30.

In the event of an impact to the vehicle 30, the impact sensor 72 may detect the impact and transmit a signal through the communications network 70 to the controller 68. The controller 68 may transmit a signal through the communications network 70 to the inflator 66. The inflator 66 may discharge and inflate the airbag 76. During inflation, the main panel 22 may extend from the housing 64 toward the passenger seat 56 in the generally vehicle-rearward direction, and the extension 24 may extend from the main panel 22 in a direction generally facing the driver side of the vehicle 30. When the extension chamber 38 is inflated, the side panel 26 may be spaced from the main panel 22.

Figure 8:
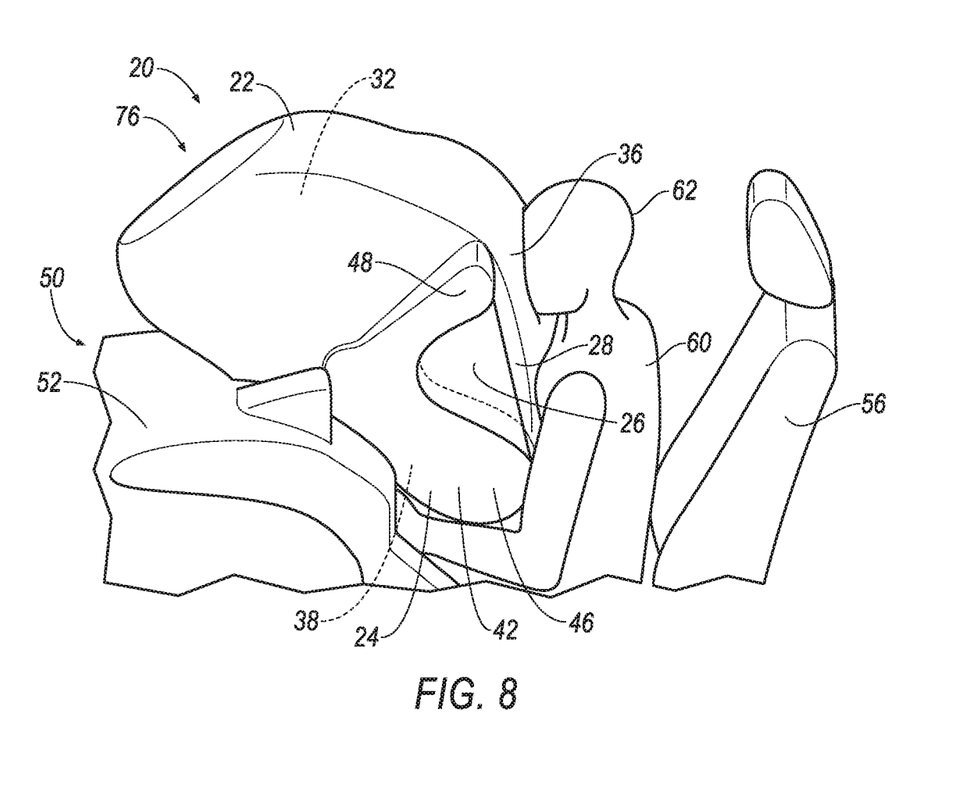
FIG. 8 is a side view of the airbag in the inflated position and an occupant during a first stage of a vehicle impact.
Figure 10:
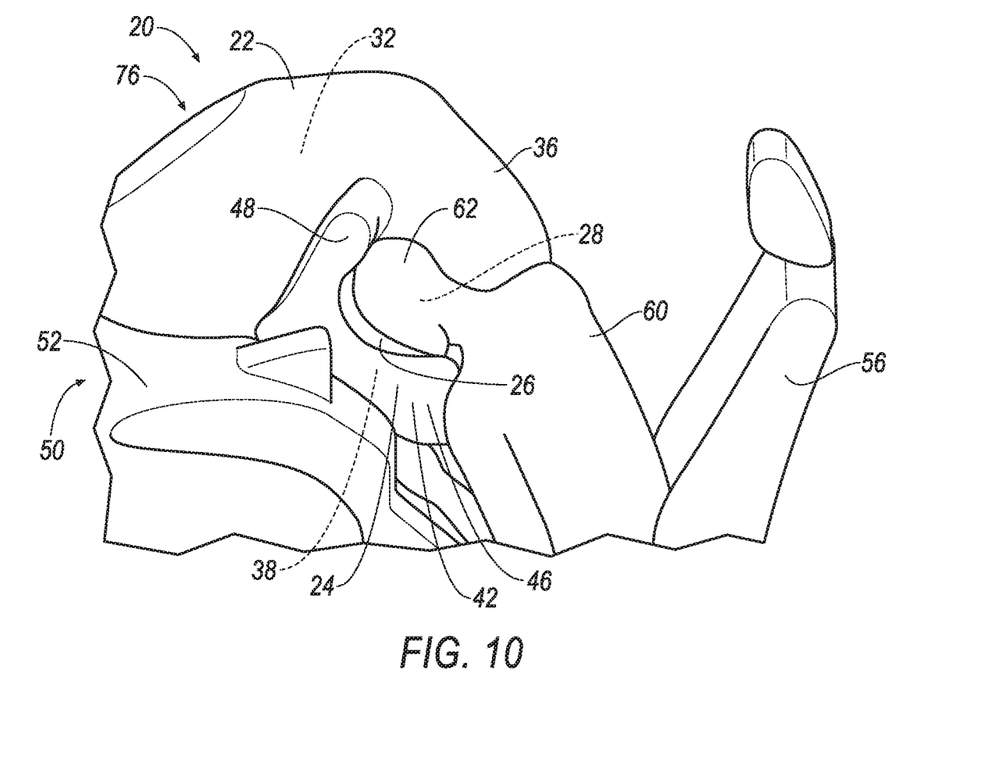
FIG. 10 is a side view of the airbag in the inflated position and the occupant during a third stage of a vehicle impact.

With reference to FIGS. 8-10, three stages of a vehicle impact, e.g., an offset impact, angular impact, small overlap impact, etc., are shown. In a first stage of a vehicle impact, as shown in FIG. 8, the occupant 60 may be thrust forward and the head 62 of the occupant 60 may contact the impact surface 36 of the main panel 22. Because of the offset nature of the vehicle impact, the head 62 may begin to slide off of the impact surface 36 and toward the extension 24.

In a second stage of a vehicle impact, as shown in FIG. 9, the head 62 may begin to enter the cavity 28 and make contact with the side panel 26 and the extension 24. The extension 24 and the side panel 26 may begin to slow down movement and rotation of the head 62. Because of the presence of the side panel 26, the extension 24 may not need to rely on opposing forces between the extension 24 and the instrumental panel 52 to slow down movement and rotation of the head 62.

In a third stage of a vehicle impact, as shown in FIG. 10, the head 62 may begin to exert a greater force on the extension 24 and the side panel 26. This force may pull the airbag 76 generally along the direction of the force, and the airbag 76 may begin to rotate. Because of this rotation, the airbag 76 may substantially maintain its position between the occupant 60 and the instrument panel 50. By maintaining this position between the occupant 60 and the instrument panel 50, the airbag may 76 continue to provide the benefits of airbag protection during the third stage of a vehicle impact and reduce the risk of the occupant 60 contacting vehicle components such as the instrument panel 50, dashboard, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag comprising:
a main panel defining an inflation chamber and being inflatable to an inflated position;
an extension extending directly from the main panel and defining an extension chamber; and
a side panel spaced from the main panel in the inflated position and fixed to the extension, the side panel being external to the extension chamber;
the side panel, the extension, and the main panel defining a cavity external to the extension chamber.

2. The airbag of claim 1, wherein the extension has a cross section that is generally concave.

3. The airbag of claim 1, wherein the extension includes a perimeter surface extending from the main panel and an outer surface attached to the perimeter surface and spaced from the main panel in the inflated position, and the extension chamber is defined by the perimeter surface, the outer surface, and the main panel.

4. The airbag of claim 3, wherein the side panel is fixed to the perimeter surface.

5. The airbag of claim 4, wherein the cavity is defined by the perimeter surface, the side panel, and the main panel.

6. The airbag of claim 1, wherein the extension chamber is in fluid communication with the inflation chamber.

7. The airbag of claim 6, wherein the extension chamber is in fluid communication with the inflation chamber via a hole defined by the main panel.

8. The airbag of claim 1, further comprising a tether in the extension chamber extending across the main panel from one portion of the extension to another portion of the extension.

9. The airbag of claim 8, wherein the extension includes a perimeter surface extending from the main panel and an outer surface attached to the perimeter surface and spaced from the main panel in the inflated position, and the tether extends from one portion of the perimeter surface to another portion of the perimeter surface.

10. The airbag of claim 1, wherein a volume of the extension chamber is less than a volume of the inflation chamber.

11. The airbag of claim 1, wherein the cavity is external to the inflation chamber.

12. The airbag of claim 1, wherein at least a portion of the extension is between the side panel and the main panel.

13. The airbag of claim 1, wherein the side panel is uninflatable when the main panel is in the inflated position.

14. The airbag of claim 1, wherein the main panel includes an impact surface facing a rearward direction, and wherein the cavity is open in the rearward direction.

15. The airbag of claim 1, wherein the cavity is designed to receive a head of an occupant.

16. The airbag of claim 1, wherein the main panel includes an impact surface and the extension is spaced from the impact surface.

17. The airbag of claim 1, wherein the extension includes a first leg and a second leg extending relative to the first leg at an angle less than 180 degrees, and the side panel extends across the main panel in the inflated position from the first leg to the second leg.

18. The airbag of claim 1, wherein the extension is cantilevered on the main panel.

19. An instrument panel assembly comprising:
   an instrument panel; and
   an airbag supported on the instrument panel;
   the airbag including a main panel defining an inflation chamber and being inflatable to an inflated position;
   the airbag including an extension extending directly from the main panel and defining an extension chamber;
   the airbag including a side panel spaced from the main panel in the inflated position and fixed to the extension, the side panel being external to the extension chamber; and
   the side panel, the extension, and the main panel defining a cavity external to the extension chamber.

20. The instrument panel assembly of claim 19, wherein the extension in the inflated position is spaced from the instrument panel.

\* \* \* \* \*